UNITED STATES PATENT OFFICE.

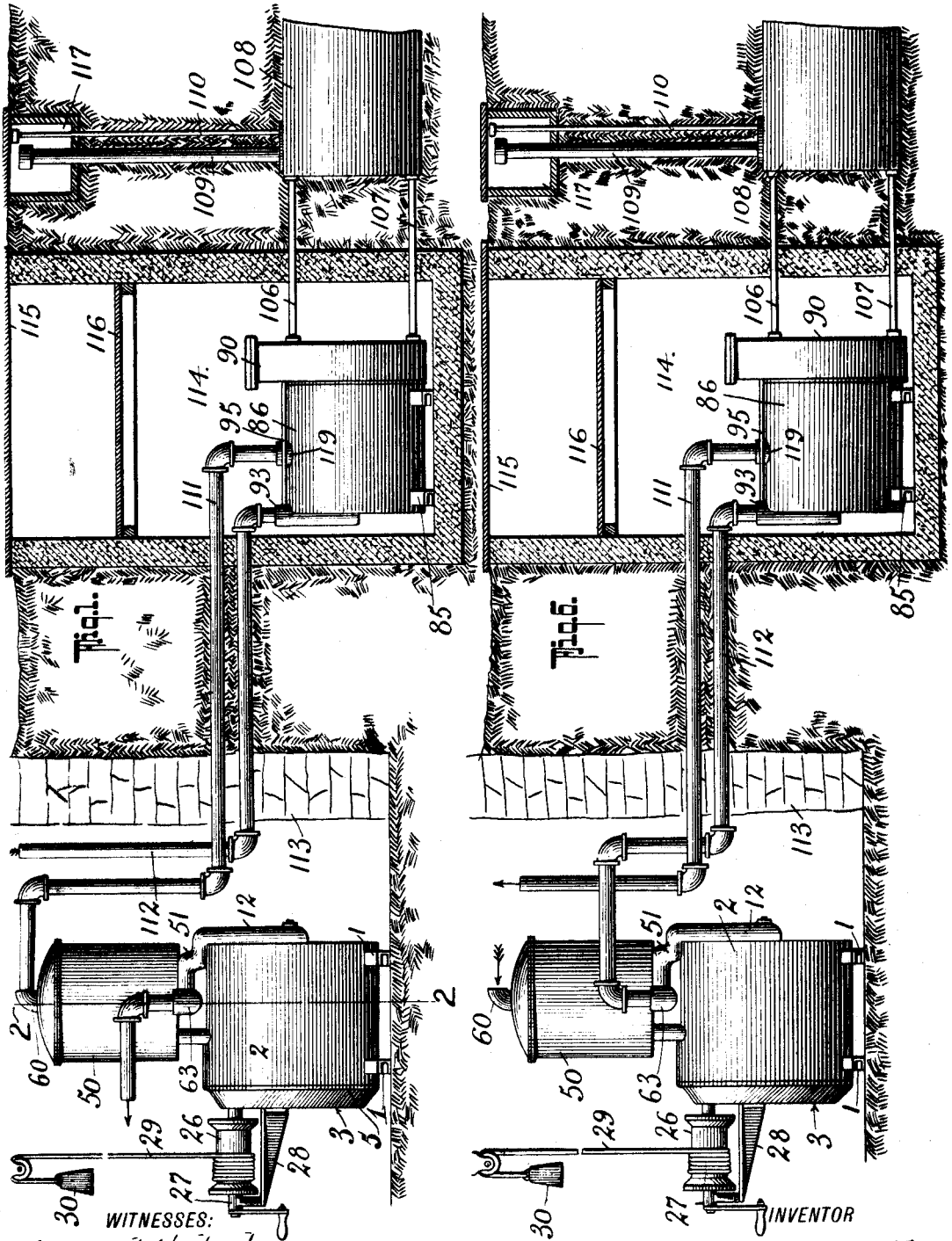

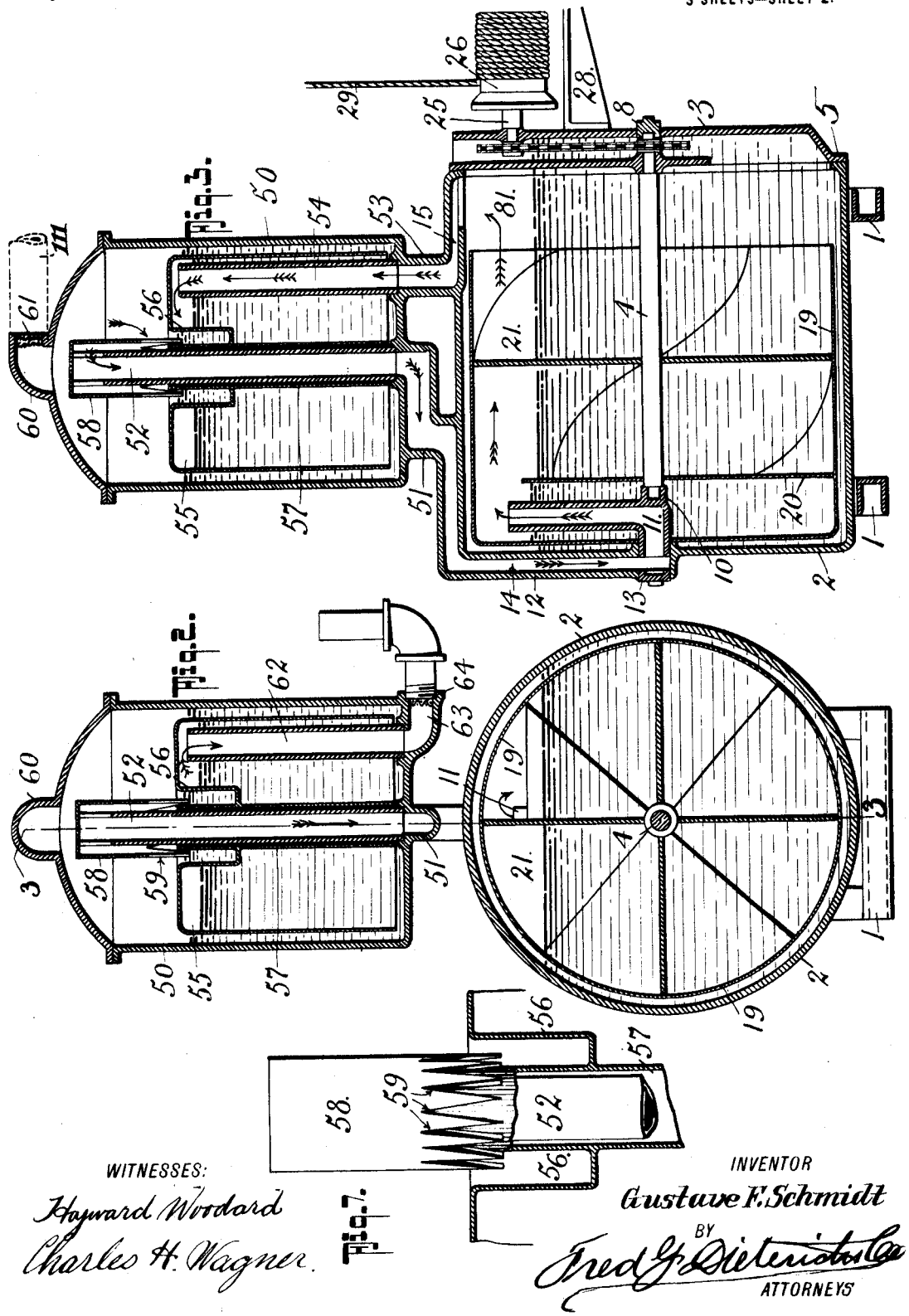

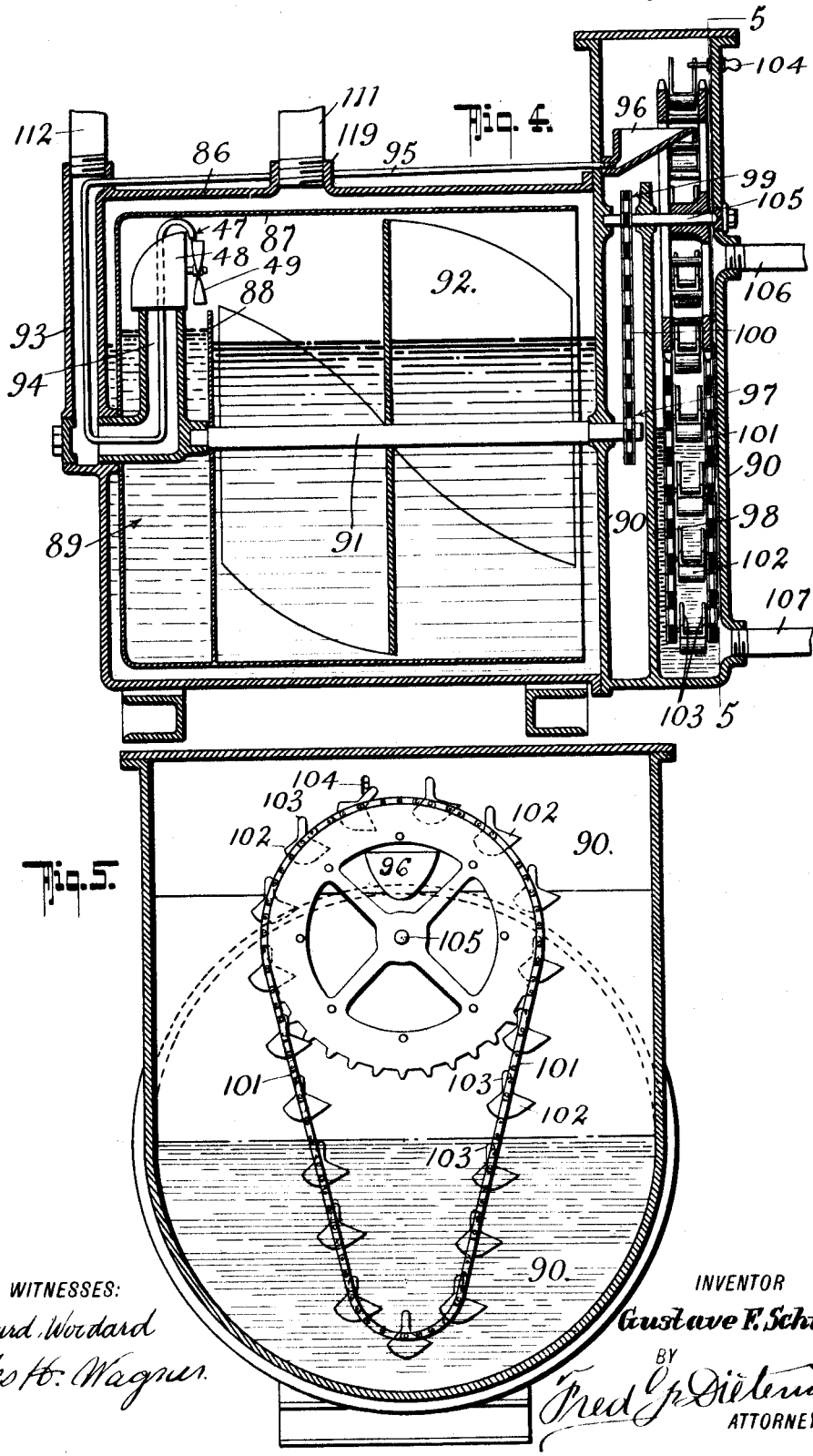

GUSTAVE F. SCHMIDT, OF RICHMOND, VIRGINIA.

CARBURETING APPARATUS.

1,137,535.  Specification of Letters Patent.  Patented Apr. 27, 1915.

Application filed April 9, 1909. Serial No. 488,807.

*To all whom it may concern:*

Be it known that I, GUSTAVE F. SCHMIDT, residing at Richmond, in the county of Henrico and State of Virginia, have invented certain new and useful Improvements in Carbureting Apparatus, of which the following is a specification.

My present invention provides a carbureting apparatus for residences and factory use, and in its generic nature my invention provides a blower and regulator bell in a single mechanism, which is adapted to be set up in a building and piped-up with a carbureter, located in a pit outside of the building, the carbureter being piped-up with a supply tank which may be buried below the frost line outside of the building.

My invention also provides means whereby the gas and air currents which pass through the carbureter may be made to drive an elevator for supplying gasolene to the carbureter automatically in the required amounts as needed.

In this application I make no claim *per se* to the structure disclosed in Figures 2 and 3 of the drawings, as such forms a part of the subject matter of another application.

I make no claim *per se* to the structure shown to the left of the wall 113 in Figs. 1 and 6 as that forms the subject matter of another application.

My invention also embodies those novel details of construction, combination and arrangement of parts all of which will be first described, then be specifically pointed out in the appended claims, and illustrated in the accompanying drawings, in which:

Fig. 1, is an elevation and part sectional view, illustrating the application of my invention. Fig. 2, is a section on the line 2—2 of Fig. 1. Fig. 3, is a section on the line 3—3 of Fig. 2. Fig. 4, is a vertical section of the carbureter. Fig. 5, is a section on the line 5—5 of Fig. 4. Fig. 6, is a view similar to Fig. 1, showing a modified way of connecting the parts constituting my complete apparatus to modify their operation. Fig. 7, is a detail section and part elevation of a portion of my invention.

Referring now to the accompanying drawings, in which like letters and numerals of reference indicate like parts in all of the figures, it will be seen that upon a suitable support 1 the blower casing 2 is set. The casing 2 is closed by a head 3 which may be bolted to the casing 2 through the flange 5.

4 represents the blower shaft, one end of which engages a plug bearing 8 in the casing head 3 and the other end is held in a bearing 10, carried by an L-pipe 11, one end of which is threaded in the rear wall of the casing 2 and communicates with the passage 14, formed by the rear wall of the casing, and by the integrally formed pipe-like wall 12, a removable plug 13 being provided for gaining access to the passage 14 in alinement with the blower shaft, if desired.

The casing 2 has a passage 15 that communicates with the pressure chamber 81, formed by the blower casing 2, and an inner casing 19 that houses the blower fan 21 and is divided transversely by a partition 20 to form a chamber for the pipe 11. The construction of the blower mechanism which includes the shaft 4, the fan 21 and the inner casing 19 is of the ordinary type and *per se* forms no part of my invention.

The drum shaft 25 is held in a bearing in the head 3 and in a bearing 27 on a bracket 28, the drum 26 receiving the cable 29 that is connected with the weight 30, while a handle (shown in full lines in Fig. 1) may be provided for winding up the cable on the drum. The regulator casing 50 is supported over the casing 2 by integrally formed pipe sections 51—53, which form continuations of the passages 14 and 15, respectively. The pipe section 51 has its bore opening centrally into the casing 50, while the pipe 53 communicates with the casing 50 near the outer wall thereof.

52 designates a pipe held centrally within the casing 50 and registering with the central opening therein, while a pipe 54 is held over the opening into the pipe section 53, as shown. The central pipe 52 extends to near the top of the casing 50 and carries a hood 58 whose lower edge is cut into V-shaped portions 59 to dip into a tank 56 formed in the top of the gas bell 55, which bell 55 has a tube 57 to slip over the pipe 52 and form a bearing for the bell. The pipe 52 is slitted at the top so as to afford communication between the interior of the pipe 52 and interior of the hood 58 at all times. When the bell 55 is in its lowered position, the pipe 54 extends to near the top of the bell, as shown in Fig. 3 of the drawings.

The casing 50 incloses a chamber above the bell 55, access to which is had through the elbow 60, which may be provided with a filter screen 61, if desired.

62 designates the outlet pipe within the bell 55 that passes through the casing 50 and terminates in the outlet 63, to which the gaseous fluid delivery pipe, or main, may be joined, filter screens 64 being provided in the outlet 63 if desired.

In a suitable pit 114, outside of the building 113, I place the carbureter 86 on a suitable support 85. The pit 114 may be closed by double covers 115—116. The carbureter 86 consists of a casing having a hollow head 90 and inclosing a rotator casing 87 divided by a partition 88 to form a chamber 89 for the pipe 94 that connects with the integrally formed pipe 93, see Fig. 4, of the drawings.

Within the casing 87 is a rotator 92, having a shaft 91, journaled in suitable bearings in the hollow head 90 and in the pipe 94. The shaft 91 projects through one wall of the head 90 and carries a gear 97 over which an endless chain 100 passes, the chain 100 also passing over a gear 99 on the elevator shaft 105 that is journaled in bearings in the closure wall of the head 90 and the partition 98 of such hollow head. On the shaft 105 the bucket conveyer 101 is mounted, through the medium of the conveyer gear and chain. The bucket conveyer consisting of the chain 101 and the buckets 102 which have arms 103 to be engaged by trip pin 104 to empty the contents of the bucket into a funnel 96, that is piped-up through a pipe 95 within the chamber 89, the pipe 95 passing through the pipes 93 and 94, as shown, and discharging its contents through the hood 48 onto the fan 49, the outlet 47 of the pipe 95 being arranged to discharge the contents of the pipe directly onto the fan 49. Gasolene is admitted into the elevator casing or head 90 from the buried tank 108 through the pipe 107, a vent pipe 106 being provided for the usual purposes.

The tank 108 may be buried at a suitable distance from the building 113 and gasolene may be supplied to the tank 108 through the pipe 109, a vent pipe 110 being provided for the usual purposes. The entrant end of the pipes 109 and 110 are located in a pit 117, accessible from the surface. The air intake pipe 112 connects with the pipe 93 of the carbureter 86 while a pipe 111 connects the outlet 119 of the carbureter with the inlet coupling of the regulator bell casing at 60.

Operation: After winding up the cable on the drum the operator releases the handle upon which the weight turns the blower 21 and sets in motion a current through the blower and regulator apparatus. The gaseous fluid, entering the regulator casing at the entrance 60, passes into the chamber formed between the bell 55 and the casing 50 and passes beneath the hood 58 from which it enters the pipe 52 and is sucked into the chamber of the blower casing, it being forced by the blower from the blower casing 19 into the chamber 81 of the casing 2, from which it passes through the passage 15 into the pipe 54 where it empties under the bell 55. Gaseous fluid is taken from the apparatus by the pipe 62 that connects with the outlet 63 which in turn connects with the distribution mains.

The drawing of the gaseous fluid through the apparatus by the fan 20 from the entrant end 60 to the exit 63 causes a suction of gas through the coupling 60 which gaseous fluid enters through the pipe 111 that is connected thereto, the pipe 111 being connected to the outlet of the carbureter 86. As gaseous fluid is sucked from the carbureter 86 through the pipe 111, air is sucked into the carbureter 86 through the pipe 112, the air entering through the pipes 93 and 94. The suction created by the air current from the entrance 93 to the outlet 119 of the carbureter 86 causes the gasolene that leaves the pipe 95 to be vaporized and mixed with the air as it passes through the carbureter 86 and sets the rotator into operation, which in turn operates the elevator 101 and elevates the gasolene into the funnel 96 to supply the pipe 95, it being understood that the gasolene is constantly flowing into the elevator casing 90 through the pipe 107, while the air within the casing 90 is displaced into the tank 108 through the pipe 106.

In Fig. 6, I have shown a modification of my invention wherein the air inlet pipe is connected with the outlet 63 of the blower and regulator apparatus and only air and not carbureted air passes through the blower and regulator apparatuses. In this form the gaseous fluid supply for the mains is taken from the pipe 111.

The operation of the form shown in Fig. 6 is precisely the same as that shown in Fig. 1, with this exception instead of passing carbureted air through the blower and regulator apparatus, only the air is passed therethrough.

Should gaseous fluid be generated faster than it is being used in the mains the bell 55 will rise and gradually cut off the supply of air, as the case may be, through the blower and regulator apparatus by immersing the openings 59 of the hood 58, and when the bell 55 is completely elevated and completely immerses the openings 59 no air current can pass through the pipes 52 and hence there will be a greater relative pressure on the outlet side than on the inlet side of the blower which will be sufficient to stop the movement thereof, and as the gaseous fluid and air current through the carbureter is proportionately cut off the movement of the rotator 92 will be proportionately reduced so that when the blower 21 is no longer in operation the rotator 92 will also be stopped. Thus it will be seen that my improved generating mechanism is self-regulating and generates only as much gaseous fluid as is required for use.

By burying the carbureter 86 and the gasolene tank 108 at a distance from the building 113 and using the connection shown in Fig. 6 of the accompanying drawings, absolute safety in the use of the apparatus is assured since only so much generated gaseous fluid passes into the building as is being withdrawn from the distributing mains and used at the fixtures, (not shown).

When the mechanism shown in Fig. 4 is used in the form shown in Fig. 1, the partition 88 as the casing 87 turns will be inverted and the water drawn out of the same, thereby causing a suction in the pipe 93 in the well known manner, to draw the air through the pipe 93 and deliver it into the casing 87. When, however, the mechanism shown in Fig. 4 is used in the form of the invention shown in Fig. 6, the partition 88 performs little or no function.

From the foregoing description taken in connection with the accompanying drawings, it is thought the complete construction, operation and numerous advantages of my invention will be readily understood.

What I claim is:—

1. A carbureter comprising a casing having an inlet and an outlet, a rotator within said casing, said rotator including a cylindrical body open at one end, and a fan-like member within said cylindrical body, said cylindrical body and said fan-like member adapted to rotate together, said cylindrical body having an inlet in communication with said casing inlet whereby the gaseous fluid may pass from the casing inlet through said cylindrical body to said casing outlet to thereby operate said rotator, means for forcing gaseous fluid through said casing from the inlet to the outlet thereof, and means operated by said rotator for delivering gasoline into said cylindrical body as said rotator turns.

2. A carbureter comprising a casing having an inlet and an outlet, a rotator within said casing, said rotator including a cylindrical body open at one end, and a fan-like member within said cylindrical body, said cylindrical body and said fan-like member adapted to rotate together, said cylindrical body having an inlet in communication with said casing inlet whereby the gaseous fluid may pass from the casing inlet through said cylindrical body to said casing outlet to thereby operate said rotator, means for forcing gaseous fluid through said casing from the inlet to the outlet thereof, and means operated by said rotator for delivering gasolene into said cylindrical body as said rotator turns, said last named means including a hollow closure head for said casing and forming a gasolene reservoir, an elevator within said closure head, power transmitting connections between said rotator and said elevator, a receiver for receiving the gasolene from said elevator, and a duct connected with said receiver and delivering into said cylindrical body.

GUSTAVE F. SCHMIDT.

Witnesses:
  GEO. W. HUNTER,
  G. J. FINDLEY.